Figure 1:
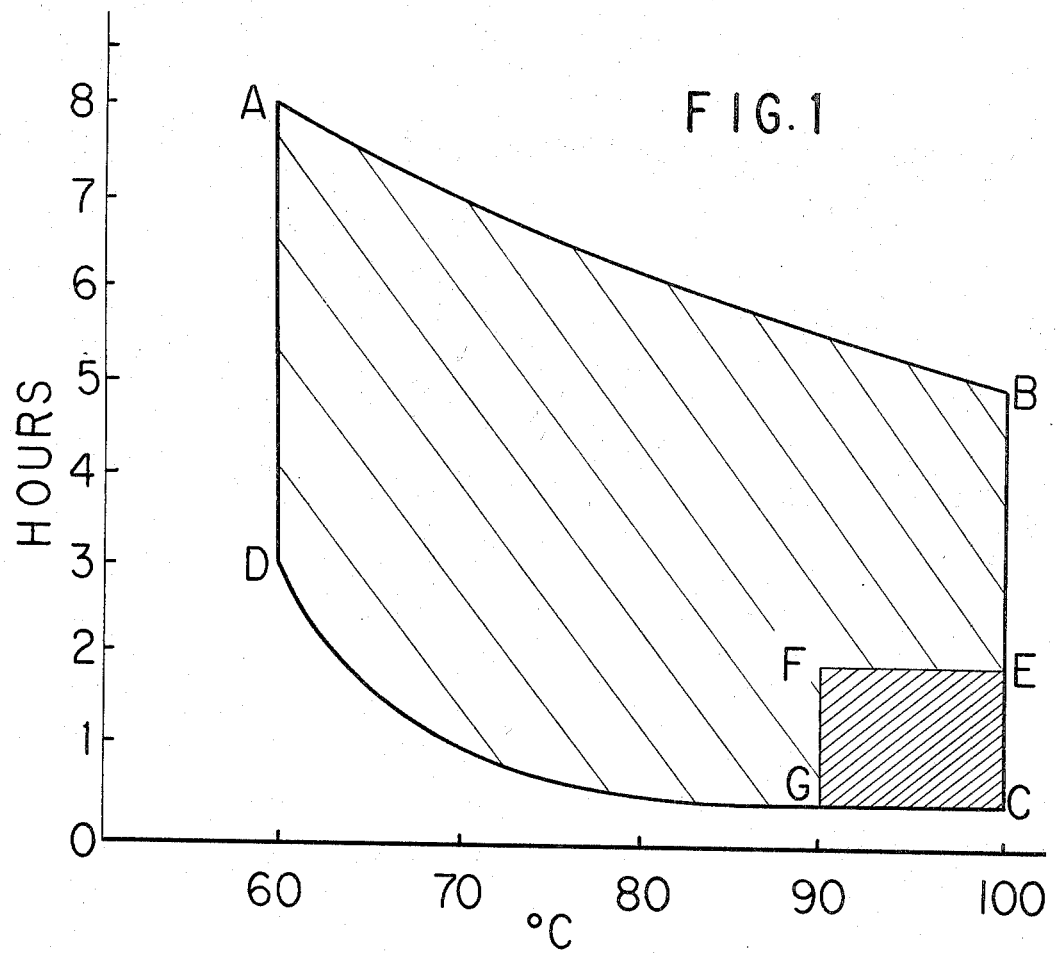

Sept. 19, 1967  S. E. FOSTER ET AL  3,342,612
DESSERT GEL
Filed Jan. 26, 1965

INVENTORS
STANLEY E. FOSTER
ARTHUR L. MOIRANO
BY
Kenyon & Kenyon
ATTORNEYS

3,342,612
DESSERT GEL

Stanley E. Foster, Thomaston, Maine, and Arthur L. Moirano, Mountainside, N.J., assignors to Marine Colloids, Inc., Springfield, N.J., a corporation of Delaware
Filed Jan. 26, 1965, Ser. No. 428,171
17 Claims. (Cl. 99—131)

This application is a continuation-in-part of our co-pending application Ser. No. 413,426, filed Nov. 24, 1964, now abandoned.

This invention relates to extractives derived from sea plants and to their recovery and treatment. It also relates to compositions comprising such extractives including aqueous gels and composition ingredients for providing aqueous gels.

One of the most extensively used extractives derived from sea plants is carrageenin. Carrageenin is a hydrocolloid derived from red sea plants which are members of the Gigartinaceae family (26 Fed. Reg. 9411, 9412—Oct. 6, 1961). The term "carrageenin" as used in the art and as used herein comprises a soluble salt or salt mixture of the polysaccharide sulfate complex.

One of the characteristic properties of carrageenin is that of forming a gel when it is dissolved in water at relatively low concentrations of the order of 1%–4% and in the presence of certain cations such as K, $NH_4$ and Ca, the K cation (e.g. provided by a non-toxic, ionizable potassium salt such as KCl) being by far the most effective cation in increasing the gel-forming capacity of a given amount of carrageenin. As conventionally extracted from the seaplant, carrageenin is composed principally of two components or fractions called kappa carrageenin and lambda carrageenin, respectively. It is the kappa component which is responsible for the aforesaid aqueous gel-forming properties of carrageenin. The lambda component has no gelling properties whatever, whether or not the K (or other) cation may be present. Usually the proportions of the kappa and lambda components in the natural sea plant are of the order of about 60% kappa and 40% lambda.

Water gels as heretofore produced from carrageenin are characterized by a short break, i.e., very little elasticity and little stretchability before breaking. The property of elasticity is a property that is distinct from that of strength as measured by the force required to break the gel under controlled tests conditions that will be described hereinbelow. By using conventionally produced carrageenin, one may readily produce a flavored aqueous gel having sufficient break force to serve as an edible dessert gel. However, the gel has such a short break as not to be commercially competitive with dessert gels which use gelatine as the gelling agent. When gelatine is used, a gel of adequate strength can be provided which likewise has the property of very substantial elasticity that currently is popular and is demanded by the consuming public.

Over a period of many years there have been a number of attempts to prepare an all-vegetable dessert gel which could compare in price and eating properties with gels prepared from gelatine. Thus Patent No. 2,466,146 discloses the incorporation of locust bean gum for the purpose of decreasing the shortness of a carrageenin base gel and, for the same purpose, Patent No. 2,864,706 discloses the employment of a substance which acts as a sequestering agent for all cations other than potassium. While for the most part these attempts have been attended with varying degrees of partial success, there have been important drawbacks such as syneresis or weeping, lack of clarity, or in the case of algin gels are adversely affected by changes in the hardness of the water that is available and supplied in different localities.

We have found that a vegetable gum gel that is elastic and also possesses good eating characteristics may be produced from carrageenin provided certain controls are maintained having an altering effect on the carrageenin and provided the sea plant is a sea plant selected from the group *Eucheuma spinosum* and *Agardhiella tenera*. It is not necessary to employ any modifying substance such as some other gum or such as a sequestering agent.

In addition to the foregoing, certain advantages are obtainable as compared with the employment of gelatine. One principal advantage is the capacity of the dessert gel to gel at room temperatures without requiring the refrigeration that is essential in order to obtain a gel when using gelatine. A dessert gel product which has the capacity to gel at room temperatures is of particular advantage in tropical or subtropical, low income regions where refrigeration often is not generally available. Gelatine sols also have a tendency to supercool below their normal gelling temperature awithout gelling, a property which necessitates prolonged refrigeration in order to obtain the dessert in readiness to be consumed. When the present invention is employed, the waiting time for the finished dessert gel is virtually eliminated in view of the reluctance of the gel to supercool. Gels produced according to this invention also have excellent unmolding properties. Moreover, in the practice of this invention the elasticity of the dessert gel can be controlled as desired and the melting temperature and the gelling temperature may be raised or lowered as desired. A further advantage of the new extractive of this invention is that it may be employed successfully in combination with fresh pineapple whereas pineapple tends to liquefy gelatine desserts.

The capacity possessed by extracts obtained from the sea plants selected from the group consisting of *Eucheuma spinosum* and *Agardhiella tenera* of forming gels of relatively high elasticity comparable to gelatine gels is unique, for it is a property that does not appear to be possessed by other sea plants of the same family. Another unusual property not possessed by known extractives obtained from other sea plants of the same family is that whereas carrageenin as conventionally produced from other sea plants possesses much greater sensitivity to potassium ions than to calcium ions in developing gel strength, extractives may be produced from the sea plants *Eucheuma spinosum* and *Agardhiella tenera*, which exhibit reverse sensitivity in that the extractive possesses good sensitivity to calcium, which sensitivity to calcium usually exceeds the sensitivity of the extractive to potassium. However, it was further discovered that particularly as regards the property of sensitivity to the calcium cation, this unique property of the extractive obtined from *Eucheuma spinosum* and *Agardhiella tenera* is easily and quickly destroyed under the conditions conventionally employed for the extraction of carrageenin. Accordingly, the technique of extraction is important in order to obtain and preserve the aforesaid unique potential properties of the carrageenin contained in these sea plants.

Carrageenin conventionally is extracted from a sea plant at a temperature at or approaching the boiling point of water, i.e., at about 90°–100° C., and at a pH between 10 and 12 provided by the inclusion in the aqueous cooking liquor of an alkali such as calcium hydroxide or sodium hydroxide, the cooking period during which extraction occurs being from about 2 to about 7 hours. After the cooking has been completed the solution containing the carrageenin is separated from the residual sea plant as by filtration or centrifugation while the solution containing the extracted carrageenin is at a temperature at or close to the cooking temperature. Since the separation of the solution containing the carrageenin from the residual sea plant may require about 3 to 4 hours for its completion, the total period of exposure to temperatures at or close to cooking temperatures and to the pH prevailing during cooking usually varies from about 18 to about 24 hours.

One of the requirements for the development of the unique properties possessed by the extractive obtained from the sea plants *Eucheuma spinosum* and *Agardhiella tenera* is that the cooking must be in the presence of calcium hydroxide as distinguished from some other source of alkalinity. The amount of calcium hydroxide should be at least about 3.7% by weight on the weight of the dry sea plant and preferably is at least about 4.5%. The optimum quantity of calcium hydroxide is about 7%. Further increase in the quantity of calcium hydroxide does not result in further development of the desired properties and, principally from the standpoint of economy, about 15% is a maximum. Depending on the quantity of calcium hydroxide that is employed within the aforesaid range, the pH during cooking will range from about 10.2 to about 11.2.

It likewise is essential in order to develop the unique properties of the extractive from *Eucheuma spinosum* and *Agardhiella tenera* to control the extent to which the extract is exposed to the combined conditions of high temperature and high pH, for if the extract is over-exposed to such conditions the elasticity of the gel is greatly impaired and sensitivity to the calcium cation becomes completely lost.

In the practice of this invention it normally is preferable to employ a cooking temperature of about 90°–100° C. inasmuch as cooking at lower temperatures requires a longer time. Thus it normally is impossible to employ a cooking temperature lower than about 60° C. at 60° C. at least about 3 hours of cooking is required under the aforesaid conditions of percentage of calcium hydroxide and pH, while the maximum permissible cooking period is about 8 hours. At a temperature of about 90°–100° C. under said conditions of percentage of calcium hydroxide and pH the cooking period may be from about three-quarters to 4 hours and preferably is about 1 to 2 hours. At temperatures intermediate between 60°–90° C. intermediate conditions of combined temperature and time may be employed. In FIG. 1 of the accompanying drawing the limits of cooking time, which may be employed at temperatures between 60°–100° C., are shown for obtaining, on the one hand, the development of the aforesaid desired properties of the extractive from *Eucheuma spinosum* and *Agardhiella tenera,* and, on the other hand, for avoiding their destruction, the range which is acceptable being the shaded area within the lines joining the points ABCD.

Preferred practice of this invention is shown on said drawings as the more densely shaded area within the lines joining the points CEFG.

After the unique properties of the extract from the sea plants *Eucheuma spinosum* and *Agardhiella tenera* have been developed within the aforesaid limits for cooking conditions these properties may be largely preserved by lowering the pH to a pH between about 7 and about 10. At a pH below about 7 or at a pH above about 10 the sensitivity to calcium cations for the development of acceptable gel strength falls off quite rapidly. Preferably, the pH is reduced so as to be between about 8 and about 9. When the pH has thus been reduced, the filtration may proceed at a temperature between about 90°–100° C., which is the temperature most favorable for facilitating filtering without impairment of calcium sensitivity. Neutralization preferably is accomplished with a non-toxic inorganic acid such as hydrochloric, sulfuric or phosphoric acid.

During cooking, mild agitation preferably is employed. Severe agitation, which would have the effect of sucking in air, is avoided since the extractive is adversely affected by conditions favoring oxidation.

Ordinarily in the practice of this invention the reduction in pH, as aforesaid, is effected after cooking and prior to filtration or other step whereby the solution containing the extract is separated from the residual sea plant. However, that which is material is the total period during which the extract is exposed to conditions of combined high temperature and high pH and, if both the cooking and the separation of the solution from the sea plant are accomplished within the aforesaid time-temperature relationship, this invention may be so practiced. Filtering procedures conventionally employed in the preparation of ordinary carrageenin extractives may be employed, such as the addition of a filter aid, e.g. of the diatomaceous earth type; and the use of a press filter, e.g. of the plate and frame type.

For sale as a commercial product, the extract contained in the solution that has been separated from the residual sea plant is reduced to solid condition. Preferably this is accomplished by precipitation by the addition to the solution of a hydrophilic alcohol such as isopropanol. For example, from 0.5 to 3 volumes of isopropanol may be used per volume of solution. The precipitate thus formed may then be recovered, washed with additional isopropanol and dried. Alternatively, the water content of the solution may be removed by evaporation, as by the employment of a drum or roll dryer, but in such case the product is not as pure and may be slightly less effective.

The resulting extractive product, whether reduced to solid form or occurring in aqueous solution, is a unique new product in the art as regards the elasticity of water gels based thereon and their property of being responsive to the presence of calcium cations in solution for the formation of such gels. While in commercial products responsiveness to the presence of calcium cations usually is availed of, the unique new carrageenin that has been produced also is responsive to the presence of magnesium cations, usually to an extent as regards gel strength developed that is somewhat less than its responsiveness to calcium cations.

For providing for the presence of the aforesaid cations calcium or magnesium, or both, the hydroxides or salts thereof may be employed which have solubility sufficient to provide a cation concentration that is effective to exercise a gelling effect on the new carrageenin.

When the new carrageenin is employed in a flavored dessert gel composition, the composition usually contains an oganic acid such as adipic acid which imparts tartness and which may constitute from about 0.35% to about 0.55% by weight of the finished dessert gel. When such an acid is present, it aids in the dissolution of salts of calcium and magnesium that possess only slight solubility. For example, calcium sulfate in the absence of an acidic component of the dessert composition has such slight solubility as to exercise little gelling effect. However, in the presence of an acidic material such as adipic acid calcium sulfate becomes sufficiently soluble to provide a calcium cation concentration of about 0.025% to about 0.05% by weight, which is sufficient to develop the gel strength potential of the new calcium-sensitive carrageenin. Since calcium sulfate is non-toxic and tasteless and has no adverse side effects, it is the preferred compound for developing the gel potential of the new carrageenin.

Examples of other calcium salts which may be used are calcium chloride, calcium citrate, and the calcium salt of glucuronic acid. More generally, any calcium salt may be employed which provides an adequate concentration of calcium cations in the presence of the other components of the formulation, except, of course, that in the case of food preparations non-toxic compounds would not be used such as nitrates, fluorides or cyanates. As above indicated in the case of calcium sulfate, an acid-soluble salt may be used as well as water-soluble salt. The calcium cation concentration in the finished gel desirably is from about 0.003% to about 0.09% by weight of the gel and preferably is from 0.013% to about 0.05%. Sufficient calcium cation concentration to develop the desired gel break force is needed. Usually continued addition of calcium cations will tend to have an adverse effect on gel break force; but such excess also has some effect on taste, and any amount which is consistent with freedom from adverse taste may be employed.

Similar consideration apply as regards magnesium cation concentration and the donors of magnesium cations. Thus magnesium sulfate and magnesium chloride are suitable, as well as magnesium phosphate and magnesium citrate. More generally, any non-toxic magnesium salt may be used that is water- or acid-soluble.

In the case of potassium cation donors when ordinary carrageenin is present in addition to the calcium-sensitive carrageenin of this invention, most potassium compounds have sufficient solubility to provide the desired concentration of potassium cations. Thus, potassium salts may be used such as potassium citrate, potassium chloride and any other non-toxic potassium salt that is water- or acid-soluble.

*Example 1*

In typical practice of this invention in accomplishing recovery of the extractive, 4 kgs. of *Eucheuma spinosum* was washed in 9 gals. of water for one-half hour and drained. The seaweed was placed in a cooker with 20 gals. of hot water at 90° C. and containing 280 gms. of calcium hydroxide (7% on the weight of the dry weed). After soaking for 15 minutes, the volume was made up to 27 gals. of hot water and cooking was continued for 1 hour at 90°–100° C. while subjecting the mass to mild agitation. During this cooking period the weed broke down rapidly and after 45 minutes of cooking 10 lbs. of a diatomaceous earth filter aid was added and was allowed to become mixed with and distributed throughout the mass. At the end of 1 hour the mass was adjusted to a pH of 8 by the addition of hydrochloric acid and filtration was started immediately. Filtration at a pressure of about 130 lbs. was accomplished in substantially 30 minutes, including a hot water follow-up for washing out the press. The clearer filtrate was coagulated using 2.5 volumes of 85% isopropanol per volume of filtrate. The coagulum was drained, washed with 85% isopropanol, dried at 38°–43° C. for 4 hours and ground. The yield was 34.4% by weight of the dry weed.

While the special extract prepared from the seaweed *Eucheuma spinosum* or *Agardhiella tenera* may provide the sole gelling agent for a dessert gel when a highly elastic dessert gel is desired, one may, if desired, use the special extractive in combination with ordinary carrageenin, thereby enabling the producer of the dessert gel composition to adjust the elasticity and firmness of the gel so as to suit all kinds of tastes. The amount of ordinary carrageenin that is used in such a blend will be a minor proportion and normally will not be more than about 25% of the combined weight of the special extractive and the ordinary carrageenin. The presence of the ordinary carrageenin also aids in providing desired unmolding properties of the gelled desserts. When the dessert gel contains ordinary carrageenin, the gel strength of the ordinary carrageenin is developed by a salt which provides a potassium cation since ordinary carrageenin is sensitive to potassium and has little sensitivity to calcium. However, for developing the gel strength characteristics of the special extractive a salt or hydroxide which likewise provides for the presence of calcium cations (or magnesium cations) is provided due to the reverse sensitivity of the special extractive in that it exhibits greater sensitivity to calcium and magnesium cations rather than potassium cations.

The following is a typical dessert gel formulation according to this invention which contains the special extract prepared, as aforesaid, in combination with ordinary carrageenin:

| | | |
|---|---|---|
| Water (2 cups) | ml | 474 |
| Cane sugar | gm | 77.05 |
| Adipic acid | gm | 2.50 |
| Special extract | gm | 3.50 |
| Calcium sulfate | gm | .30 |
| Ordinary carrageenin | gm | .50 |
| Tripotassium citrate | gm | 1.25 |
| Flavor and color as desired. | | |

In the foregoing formulation the sugar provides sweetening and the adipic acid provides tartness. Other substances may be used for sweetening. Other compounds which may be used to impart tartness are citric acid and fumaric acid. The source of calcium cations is the calcium sulfate and the source of potassium cations is the tripotassium citrate, which likewise serves to buffer the finished dessert gel at a pH of about 4.

The dessert gel having the aforesaid composition disperses readily in hot water and sets at room temperature. When it is set it possesses very desirable properites of elasticity and chewiness combined with a gel break strength of about 130 gms. The gel that is formed is brilliant and does not toughen on aging as do gelatine gels. It also is free of syneresis and unmolds without sticking, whereas gelatine dessert gels are prone to stick to molds, which must be heated before unmolding. When unmolded the gel exhibits little tendency to slump.

Figure 2:
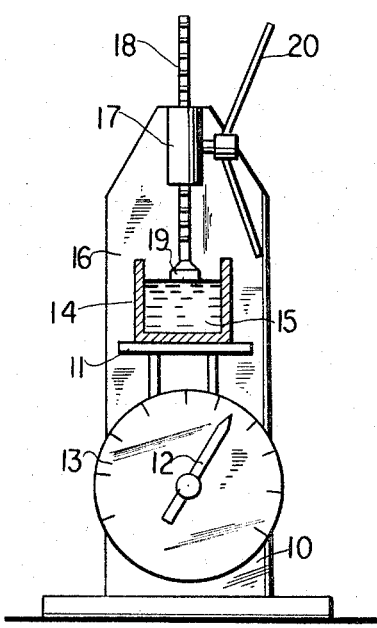

The gel strength of a gel is measured in terms of its breaking strength value, the breaking strength values given herein being determined in the following way. A 500-gram quantity of solution to be tested is made up so as to contain the prescribed percentages of extractive and other ingredients. It is convenient to initially prepare the composition so that the amount of water is slightly less than the total amount required and heat the composition on a water bath at about 180° F. with agitation for about 5 minutes in order to effect the dissolution of the solids. The solution is then adjusted to the final 500-gram weight and while it is still hot it is divided into three equal portions, each portion being placed in a 7 cm. diameter crystallizing dish that is 5.0 cm. deep which is placed in a water bath maintained at the prescribed testing temperature. Thereupon the dishes are removed from the water bath and the gelled content of each is removed and is replaced in its dish after having been inverted. Each dish containing its inverted gel is placed on the pan of the measuring device that is used for gradually forcing a plunger having the prescribed diameter against the upper surface of the gel with measured force until the force suddenly falls off at the moment of rupture of the gel, the maximum noted force being the breaking force. The breaking force for each of the three samples is noted and the average thereof is taken as the gel strength value for the tested extraction. While other types of measuring device may be employed, the device used in obtaining the breaking strength value given herein is illustrated in FIG. 2 of the accompanying drawing. A conventional spring scale 10 comprises the weighing pan 11 and the pointer 12 which indicates directly on the scale 13 the force applied to upper surface of the pan 11. The pan 11 is of such size as to support the crystallization dish 14 thereon that contains the inverted gel 15. Mounted on frame 16 there is the bracket 17 for holding the plunger 18 vertically disposed so that the head 19 may come to bear at the approximate center of the gel 15 in the dish 14. By turning the handle 20 the plunger 18 may be moved up or down through appropriate mechanism such as a rack and pinion. The head 19 desirably is detachable from the plunger 18 so that heads of different diameters may be used as prescribed. In use, the plunger head is forced gradually against the surface of the gel 15 while noting the applied force as indicated by the pointer 12. When the gel ruptures the pointer snaps back and the applied force immediately prior to snapping back is noted as the breaking strength or gel strength of the gel. Unless otherwise stated, the gel break force values mentioned herein and in the claims are determined at 25° C. and using a head 19 having a diameter of 21.45 mm.

While the test break force value is determinable for any given formulation containing the extractive to be tested, when reference is made herein and in the claims to the extractive, as such, possessing a gel strength force responsive to the presence of calcium cations, the reference is to the break force value of the formulation composed as follows:

| | |
|---|---|
| Water _____ mls__ | 100.0 |
| Calcium chloride _____ gm__ | 0.1 |
| Extractive to be tested _____ gm__ | 1.0 |

For dessert gel purposes, the gel break force may vary according to taste. The gel break force that usually is preferred is of the order of 115 to 145 gms. so as to provide preferred consistency and chewiness. However, when the gel break force is over 100 gms. the properties are good and a break force over 80 gms. is acceptable for some purposes. If the gel break force exceeds about 200 gms., the gel is somewhat too hard, but again this is largely a matter of personal taste.

As has heretofore been mentioned, one of the advantages of this invention is that the calcium-sensitive extractives provide gels which set without refrigeration. The gelling temperature as well as the gel break force is affected by the lime content that is present during cooking, in that if the lime content is lower than that required for proper development of the gel break force the melting point of the gel also is lower. The gelling temperature tends to follow the gel break force and when this invention is practiced so as to develop desired gel break force, the gelling temperautre normally is in the most desirable range, namely, from about 50° to about 70° C. By contrast, the gelling temperature of most gelatine desserts is around 5°–10° C. While it is preferable that the dessert gel composed according to this invention form a gel at room temperature, this is not essential and merely is an advantage of normal practice of this invention.

It also is desirable, in order to meet popular taste, that the melting temperature of the gel dessert be substantially above body temperature. This property likewise is developed as an incident to the treatment control hereinabove described, the melting temperature usually being of the order of 50°–70° C.

In normal commercial practice the gel dessert is made up in packages sufficient to produce 1 pint of dessert (two cups). For this quantity, the amount of extractive desirably is about 3.5 gms., although it may be varied according to taste from about 2.5 to 4.5 gms. More generally, the amount of extract may range from about 0.4% to about 1.2%. Normally, the extract is at least about 0.5% of the gel in order to develop acceptable gel break force, and does not exceed about 1% of the gel. Additional extractive may be used, but it is uneconomical to do so and tends to produce a more pasty consistency and may interfere with release of flavor.

Since the gel desserts which employ the unique carrageenin product of this invention have the property of gelling at room temperature, it usually is preferable to employ a calcium cation donor such as calcium sulfate which dissolves slowly so as to permit the other ingredients of the gel to dissolve before the gelling effect of the calcium cation comes into play to any substantial extent.

*Example 2*

400 gms. of washed and drained *Eucheuma spinosum* was made up to 9000 gms. with hot water and heated to 90°–100° C. under mild agitation to break down the weed. 28 gms. of lime (7% of the dry weed) slurried in 600 mls. of hot water was added and the cooking time was started immediately. After 1 hour 1900 mls. of the paste (pH 10.7) was neutralized to a pH of from 7.5 to 8.5 with 37 mls. of 3M hydrochloric acid. 80 gms. of diatomaceous earth filter aid and 950 mls. of hot water were added. The paste was filtered and the filter cake was washed with 370 mls. of hot water to obtain 2570 gms. of total filtrate. The carrageenin content of the filtrate was coagulated using 2.5 volumes of 85% isopropanol per volume of filtrate. The coagulum was washed with 85% isopropanol, drained and dried at 55° C. and ground. The yield was 36.3%. A dessert gel formulation was prepared having the following composition:

| | |
|---|---|
| Water _____ mls__ | 237 |
| Cane sugar _____ gms__ | 37.5 |
| Adipic acid _____ gms__ | 1.0 |
| Calcium citrate _____ gms__ | 0.28 |
| Raspberry flavor and color _____ gms__ | 0.25 |
| Carragenin extractive _____ gms__ | 1.95 |

The composition dispersed well in hot water and upon cooling to room temperature the resulting dessert gel possessed a high degree of elasticity, was brilliant and exhibited no syneresis and had a gel break strength of 114 gms. It is also unmolded well, exhibited little slump when unmolded and had desirable chewiness when eaten.

When the aforesaid example was repeated using longer cooking times of 2, 3 and 4 hours, the gel break force values obtained were, respectively, 111 gms., 97 gms. and 83 gms., thus showing the loss of gel break strength resulting from continued exposure to high cooking temperatures at the pH required during the cook in order to develop the desired properties of elasticity and calcium sensitivity.

This property of the carrageenin extracted from *Eucheuma spinosium* or *Agardhiella tenera* is to be contrasted with the carrageenin extracted from *Chondrus crispus* which continues to develop enhanced responsiveness to potassium upon prolonged heating.

*Example 3*

150 gms. of *Eucheuuma spinosum* that had been washed and dried was made up to 3600 gms. with water and heated to 90°–100° C. under mild agitation to break down the weed. Four 650-ml. aliquots of the paste were removed and each placed under mild agitation at 90°–100° C.

*Sample 3a*.—To the first 650-ml. aliquot 0.81 gm. of lime (3% of the weight of the dry weed) was added and the paste was cooked at 90°–100° C. for 1 hour, the pH being 9.5. The paste was neutralized to pH 7.5–8.5 with 4 mls. 3M hydrochloric acid. 27 gms. of diatomaceous earth filter aid and 325 mls. hot water were added and the paste filtered. The filtrate was coagulated with 2.5 volumes of 85% isopropanol and the coagulum was washed with 85% isopropanol, dried at 55° C. and ground.

*Samples 3b, 3c and 3d* were prepared similarly except that the percentages of lime on the dry weight of the weed were, respectively, 4%, 5% and 6%.

The gel break force values of gel compositions having the formulation given in Example 1 when employing the extractives of Example 3 were as follows:

| Sample No. | Percent Lime in Cook | Gel Break Force, gms. |
|---|---|---|
| 3a | 3 | 65 |
| 3b | 4 | 92 |
| 3c | 5 | 122 |
| 3d | 6 | 126 |

The necessity for the presence of the required percentage of line in the cook in order to develop sensitivity to calcium cations is evidenced by the foregoing example in that when only 3% of lime was present in the cook insufficient gel strength for a commercial dessert gel was obtained. In each case the gel had good elasticity.

Example 4

208 gms. of *Eucheuma spinosum* that had been washed and drained was made up to 4800 gms. with water at 65° C. which resulted in a final temperature of 60° C. that was maintained constant by use of a water bath. The weed was broken up with mild agitation and 14.6 grms. of lime (7% of the dry weed) dispersed in 200 mls. of hot water was added and cooking was started.

*Sample 4a.*—After 1 hour of cooking at 60° C. 650 mls. of paste was removed and neutralized to pH 7.5–8.5 with 13.5 mls. of hydrochloric acid. After adding 27 gms. of diatomaceous earth type filter aid and 325 mls. of hot water the paste was filtered. The extracted carrageenin in the filtrate was coagulated in 2.5 volumes of 85% isopropanol, and the resulting coagulum was washed with 85% isopropanol, dried at 55° C. and ground.

*Samples 4b, 4c, 4d, 4e and 4f* were prepared similarly except that the cooking times were, respectively, 2, 3, 4, 5 and 6 hours. Dessert gels having the formulation given in Example 1 when using these extractives exhibited gel break force values as follows:

| Sample No. | Hrs. Heated at 60° C. | Gel Break Force, gms. |
|---|---|---|
| 4a | 1 | 55 |
| 4b | 2 | 68 |
| 4c | 3 | 81 |
| 4d | 4 | 96 |
| 4e | 5 | 107 |
| 4f | 6 | 114 |

As shown by the values given in the foregoing table, the required amount of cooking in the presence of lime in order to develop the desired sensitivity to calcium cations requires at least 4 hours at 60° C.

Example 5

Example 4 was repeated but with a cooking temperature of 70° C. with the following results:

| Sample No. | Hrs. Heated at 70° C. | Gel Break Force, gms. |
|---|---|---|
| 5a | 1 | 85 |
| 5b | 2 | 96 |
| 5c | 3 | 114 |
| 5d | 4 | 133 |
| 5e | 5 | 139 |
| 5f | 6 | 123 |

Example 6

An extractive of *Eucheuma spinosium*, which is identified below as Sample 6a, was prepared in substantial accordance with the procedure of Example 2, the cook being for 1 hour at at temperature of 90°–100° C. in the presence of substantially 7% lime on the weight of the dry weed.

An extractive of *Chondrus crispus*, which is referred to below as Sample 6b, was prepared similarly to Sample 6a except that in this case the weed was held at about 95° C. for about 18 hours in the presence of 16–20% of lime.

Varying amounts of $CaCl_2$ and $KCl$ were included in 1% gels, and the gel break force values were determined as follows:

| | Sample 6a Gel Break Force, gms. | Sample 6b Gel Break Force, gms. |
|---|---|---|
| Percent $CaCl_2$: | | |
| 0.0 | 74 | 0 |
| 0.1 | 107 | 0 |
| 0.2 | 105 | 0 |
| 0.3 | 81 | 0 |
| Percent $KCl$: | | |
| 0.0 | 73 | 0 |
| 0.1 | 76 | 84 |
| 0.2 | 84 | 189 |
| 0.3 | 88 | 257 |

It is noteworthy that carrageenin prepared from *Chondrus crispus* exhibited a very pronounced gelling responsiveness to the potassium cation but not to the calcium cation. On the other hand, the extractive from *Eucheuma spinosum* under like conditions of preparation exhibited a strong response to the calcium cation and only slight response to the potassium cation.

Example 7

An extractive of *Eucheuma spinosum* was prepared in accordance with the procedure of Example 2, the cooking being at 90°–100° C. for 1 hour in the presence of 7% lime.

A dessert gel formulation of the following composition was prepared using the extractive prepared as described:

Water _____ mls__ 237
Cane sugar _____ gms__ 37.5
Adipic acid _____ gms__ 1.0

Four samples were prepared containing different amounts of calcium sulfate and the break force value and melting temperature of each was determined with the results indicated in the following table:

| Calcium Sulfate | | Melting Temp., °C. | Break Force, gms. |
|---|---|---|---|
| Weight, gms. | Percent of Gel | | |
| 0.126 | 0.045 | 49 | 64 |
| 0.282 | 0.091 | 55 | 102 |
| 0.377 | 0.136 | 58 | 119 |
| 0.504 | 0.181 | 59 | 144 |

The melting temperature and the gelling temperature of the gel were determined by the following procedure and all references herein to melting temperature and gelling temperature were so determined.

The gel (about 5 gms.) is placed in a test tube (¾″ inside diameter) and a thermometer inserted. The tube is placed in a water bath which can be slowly heated or cooled. The bath is first slowly heated and the gel observed to go through a softening stage when the melting point is approached. The melting point is taken when the soft gel shows no more small particles or gel, and the thermometer reading is taken. The water bath is then slowly cooled and the melted gel observed until it sets so that the thermometer leaves a hole in the gel when momentarily removed. The thermometer reading is taken at this point and recorded as the setting (or gelling) point.

Example 8

150 gms. of washed and drained *Eucheuma spinosum* was made up to 3600 gms. with hot water and heated to 90° C. under mild agitation to break down the weed. 10.5 gms. of lime slurried in a little hot water was added (7% of the dry weed). The resulting mixture was cooked at 90°–100° C. for 1 hour and then was neutralized to a pH between 7.5 and 8.5 with 82 mls. of 3 M hydrochloric acid. 150 gms. of diatomaceous earth type filter aid and 900 mls. of hot water were added and the paste was filtered to obtain 3164 gms. of a light amber filtrate.

The filtrate at a temperature of 80°–90° C. was coagulated in 2.5 volumes of 85% isopropanol to give a stringy, nearly white coagulate which was drained, washed in 1 volume of 85% isopropanol, drained again and dried at 60° C. The product was ground so as to pass a #40 screen to obtain 51 gms. of a white powder (34% yield). Using the special extract prepared as above described in this example, a dessert gel was made in accordance with the formulation of Example 1 except that the content of the special extract was 3.00 gms. instead of 3.50 gms. This dessert gel had a gel break force at 10° C. of 152 gms. The gel was brilliant, it unmolded well, exhibited little slump when unmolded, had no syneresis and had desirable properties of elasticity and chewiness.

*Example 9*

Example 8 was repeated using a different shipment of *Eucheuma spinosum* and a dessert gel having the formulation according to Example 8 was prepared. The dessert gel had the properties described in connection with Example 8 except that the gel break force at 10° C. was 127 gms.

*Example 10*

An extract of *Eucheuma spinosum* was prepared in a manner generally similar to the procedure of Example 1 and the gel break force at 25° C. was determined for 1% aqueous gels containing varying amounts of magnesium chloride and calcium chloride as shown in the following table:

| Percent Salt in Gel | Break Force MgCl$_2$, gms. | Break Force CaCl$_2$, gms. |
| --- | --- | --- |
| 0.0 | 64 | 64 |
| 0.1 | 136 | 194 |
| 0.5 | 149 | 146 |
| 1.0 | 164 | 205 |
| 1.5 | 170 | 254 |
| 2.0 | 174 | 290 |

This example illustrates that the new extract of this invention exhibits gelling sensitivity not only to calcium cations but also to magnesium cations. The sensitivity to magnesium cations is somewhat less pronounced than the sensitivity to the calcium cations. However, the sensitivity to magnesium cations is such as to provide a very satisfactory elastic dessert gel in accordance with this invention.

*Example 11*

75 gms. of *Agardhiella tenera* which had been washed and drained was made up to 1800 gms. with hot water and the mixture was heated to 90° C. under mild agitation. 4.5 gms. of lime (6% of the dry weed) dispersed in a little hot water was added and the mixture was cooked for 3 hours at 90°–100° C. Thereupon the resulting paste was neutralized to a pH between 7.5 and 8.5 with 16 mls. of 3 M hydrochloric acid. 75 gms. of diatomaceous earth type filter aid and 900 mls. of hot water were added and the mixture was filtered to give 1447 gms. of a brilliant brown filtrate. The filtrate at 80°–90° C. was coagulated in 2.5 volumes of 85% isopropanol to give as a precipitate a stringy, light tan coagulum and some fines, which precipitate was drained, washed in 1 volume of 85% isopropanol, drained again and dried at 55° C. 15.6 gms. (20.8% yield) of the dry product was obtained which was ground so as to pass a #80 screen. A dessert gel having the formulation described in Example 2 was prepared. It had a gel break force at 25° C. of 126 gms. The dessert gel was brilliant, exhibited no syneresis, unmolded well, exhibited some, but not excessive, slump when unmolded, was chewy and very elastic. When the procedure of this example was repeated using a different batch of *Agardhiella tenera* very similar results were obtained except that in this instance the gel break force at 25° C. was 166 gms.

What is claimed is:

1. A water-soluble product in solid form adapted to be dissolved in water to form a gel which comprises as a gelling agent carrageenin, a major proportion of said carrageenin being carrageenin extracted from a sea plant selected from the group consisting of *Eucheuma spinosum* and *Agardhiella tenera*, a 1% water solution of which is responsive to the presence of calcium cations to form a gel having a gel break force of at least 80 gms. and a minor proportion of said carrageenin being carrageenin extracted from a sea plant other than *Eucheuma spinosum* and *Agardhiella tenera*, a 1% water solution of which is responsive to the presence of potassium cations to form a gel having a gel break force of at least 80 gms.

2. A gel-forming composition in solid form that is soluble in water to form a gel which comprises carrageenin as a gel-forming agent, a major proportion of said carrageenin being carrageenin extracted from a sea plant selected from the group consisting of *Eucheuma spinosum* and *Agardhiella tenera*, a 1% aqueous solution of which is responsive to cations selected from the group consisting of calcium and magnesium to form a gel having a gel break force of at least 80 gms. and a minor proportion of said carrageenin being carrageenin extracted from a sea plant other than *Eucheuma spinosum* and *Agardhiella tenera*, a 1% water solution of which is responsive to potassium cations to form a gel having a gel break force of at least 80 gms., and said composition also comprising, for forming said gel when said composition is dissolved in water, an ionizable compound of a cation selected from the group consisting of calcium and magnesium for supplying said cations selected from the group consisting of calcium and magnesium and an ionizable compound of potassium for supplying said potassium cations.

3. A gel-forming composition according to claim 2 wherein at least about 75% of said carrageenin consists of said carrageenin extracted from a sea plant selected from the group consisting of *Eucheuma spinosum* and *Agardhiella tenera* and wherein said composition contains a sweeting agent, a flavoring agent and a non-toxic organic acid which imparts tartness when said composition is dissolved in water.

4. A gel-forming composition in solid, particulate form that is soluble in water to form a gel, which composition comprises a sweetening agent, a flavoring agent, an organic acid for imparting tartness selected from the group consisting of adipic, fumaric and citric, carrageenin as a gel-forming agent at least 75% by weight of which consists of carrageenin extracted from a sea plant selected from the group consisting of *Eucheuma spinosum* and *Agardhiella tenera*, a 1% water solution of which is responsive to calcium cations to form a gel having a gel break force of at least 80 gms. and a substantial proportion of which less than 25% by weight consists of carrageenin extracted from a sea plant other than *Eucheuma spinosum* and *Agardhiella tenera*, a 1% water solution of which is responsive to potassium cations to form a gel having a gel break force of at least 80 gms., calcium sulfate for supplying said calcium cations, and an ionizable compound of potassium for supplying said potassium cations, when said composition is dissolved in water.

5. An aqueous gel which contains from about 0.5% to about 1.0% by weight of carrageenin, which carrageenin comprises to the extent of at least about 75% by weight carrageenin extracted from a sea plant selected from the group consisting of *Eucheuma spinosum* and *Agardhiella tenera* which is responsive to cations selected from the group consisting of calcium and magnesium to form a gel and a substantial amount up to about 25% by weight of another carrageenin extracted from a sea plant other than a sea plant of the aforesaid group, which other carrageenin is responsive to potassium cations to form a gel, said gel containing cations effective to develop a gel break force of at least 80 gms., which cations comprise potassium cations and cations selected from the group consisting of calcium and magnesium.

6. In a method wherein carrageenin is extracted from a sea plant, the steps comprising extracting carrageenin from a sea plant selected from the group consisting of *Eucheuma spinosum* and *Agardhiella tenera* while said sea plant is disposed at a temperature and for a period of time within the area ABCD of FIG. 1 in an aqueous medium containing from about 3.7% to about 15% of calcium hydroxide by weight on the weight of the dry sea plant at a pH between about 10.2 and about 11.2, separating the solution containing the extracted carrageenin from the undissolved residue of the sea plant, and reducing the pH of the solution to a pH between about 7 and about 10 before the maximum period of time as defined in relation to temperature by said area ABCD is substantially exceeded by the addition to said solution of a non-toxic acid.

7. A method according to claim 6 wherein the pH of the solution is reduced to a pH between about 7 and about 10 prior to the separation of the solution containing extracted carrageenin from the residual sea plant.

8. Carrageenin which is the product of the process of claim 6.

9. Carrageenin according to claim 8 in solid form in admixture with an ionizable solid compound of a cation selected from the group consisting of calcium and magnesium in effective amount to enhance the gelling properties of said carrageenin in a 1% solution of said carrageenan.

10. Carrageenin which is the product of the process of claim 6, which is in solid form and which imparts to a 1% solution thereof containing 0.1% of calcium chloride a gel break force of at least 80 grams.

11. A method which comprises forming an aqueous solution at elevated temperature containing dissolved therein from about 0.4% to about 1.2% by weight of carrageenin which is the product of the process of claim 6 and at least about 0.003% by weight of cations selected from the group consisting of calcium and magnesium, and thereafter cooling the solution until it gels.

12. An aqueous gel which is the product of the process of claim 10.

13. A method which comprises forming an aqueous solution at elevated temperature containing dissolved therein from about 0.5% to about 1.0% by weight of carrageenin which is the product of the process of claim 6, calcium sulfate for providing a calcium concentration of about 0.025% to about 0.05% by weight and a non-toxic organic acid in effective amount to render said calcium sulfate soluble, and thereafter cooling the solution until it gels.

14. An aqueous gel which is the product of the process of claim 13.

15. In a method wherein carrageenin is extracted from a sea plant, the steps of extracting carrageenin from a sea plant selected from the group consisting of *Eucheuma spinosum* and *Agardhiella tenera* while said sea plant is disposed in an aqueous medium at a temperature between about 90° C. and about 100° C. for a period of from about three-quarters of an hour to 2 hours in the presence of about 6% to about 8% of calcium hydroxide at a pH of about 11, reducing the pH of said solution to a pH between about 7.5 and about 9 before said upper limit of 2 hours at said temperature of about 90° C. to about 100° C. is substantially exceeded, and thereafter separating said solution containing extracted carrageenin from the residual sea plant.

16. Carrageenin which is the product of the process of claim 15.

17. A gel-forming composition in solid particulate form that is soluble in water to form a gel, said compound comprising in admixture carrageenin which is the product of the process of claim 15 in solid form, calcium sulfate and an organic acid selected from the group consisting of adipic, fumaric and citric, said calcium sulfate and said organic acid being present in amounts respectively such that when said composition is dissolved in water to form a solution containing 1% by weight of said carrageenin said calcium sulfate in the presence of said organic acid supplies calcium cations in effective amount to substantially enhance the gelling properties of said carrageenin.

References Cited

UNITED STATES PATENTS

| | | | |
|---|---|---|---|
| 2,624,727 | 1/1953 | Le Gloahec | 260—209 |
| 3,094,517 | 6/1963 | Stanley | 260—209 |
| 3,250,621 | 5/1966 | Glicksman | 99—131 |

A. LOUIS MONACELL, *Primary Examiner.*

J. M. HUNTER, *Assistant Examiner.*